United States Patent
Schaefer et al.

(10) Patent No.: US 11,001,730 B2
(45) Date of Patent: May 11, 2021

(54) COLOUR-STABLE CURING COMPOSITIONS CONTAINING POLYISOCYANATES OF (CYCLO)ALIPHATIC DIISOCYANATES

(71) Applicant: BASF SE, Ludwigshafen am Rhein (DE)

(72) Inventors: Harald Schaefer, Ludwigshafen (DE); Daniel Flojhar, Ludwigshafen (DE); Jens Scheidel, Ludwigshafen (DE); Thomas Genger, Ludwigshafen (DE); Matthias Kroner, Ludwigshafen (DE); Sebastian Emmerling, Ludwigshafen (DE); Guillermo Arens, Ludwigshafen (DE)

(73) Assignee: BASF SE

( * ) Notice: Subject to any disclaimer, the term of this patent is extended or adjusted under 35 U.S.C. 154(b) by 218 days.

(21) Appl. No.: 16/339,544

(22) PCT Filed: Oct. 2, 2017

(86) PCT No.: PCT/EP2017/074934
§ 371 (c)(1),
(2) Date: Apr. 4, 2019

(87) PCT Pub. No.: WO2018/065344
PCT Pub. Date: Apr. 12, 2018

(65) Prior Publication Data
US 2020/0181449 A1 Jun. 11, 2020

(30) Foreign Application Priority Data

Oct. 7, 2016 (EP) .................................... 16192847

(51) Int. Cl.
| | | |
|---|---|---|
| C09D 175/04 | (2006.01) | |
| C08G 18/24 | (2006.01) | |
| C08G 18/73 | (2006.01) | |
| C08G 18/79 | (2006.01) | |
| C08G 18/18 | (2006.01) | |
| C08G 18/02 | (2006.01) | |
| C08K 5/521 | (2006.01) | |
| C08K 5/526 | (2006.01) | |
| C08K 5/5333 | (2006.01) | |

(52) U.S. Cl.
CPC ......... *C09D 175/04* (2013.01); *C08G 18/022* (2013.01); *C08G 18/1875* (2013.01); *C08G 18/1883* (2013.01); *C08G 18/246* (2013.01); *C08G 18/73* (2013.01); *C08G 18/792* (2013.01); *C08K 5/521* (2013.01); *C08K 5/526* (2013.01); *C08K 5/5333* (2013.01)

(58) Field of Classification Search
CPC .... C09D 175/04; C08G 18/246; C08G 18/73; C08G 18/792; C08G 18/1875; C08G 18/022; C08G 18/1883; C08K 5/521; C08K 5/526; C08K 5/5333
See application file for complete search history.

(56) References Cited

U.S. PATENT DOCUMENTS

| | | | |
|---|---|---|---|
| 4,596,678 A | 6/1986 | Merger et al. | |
| 4,596,679 A | 6/1986 | Hellbach et al. | |
| 5,087,739 A | 2/1992 | Bohmholdt et al. | |
| 6,376,584 B1 | 4/2002 | Galbo et al. | |
| 7,122,588 B2 | 10/2006 | Fujisawa et al. | |
| 2005/0020766 A1 | 1/2005 | Rosen et al. | |
| 2011/0059251 A1 | 3/2011 | Poppe et al. | |
| 2012/0016073 A1* | 1/2012 | Bernard ............... | C08G 18/227 524/589 |

FOREIGN PATENT DOCUMENTS

| | | |
|---|---|---|
| CN | 101789944 A | 7/2010 |
| CN | 101805304 A | 8/2010 |
| DE | 33 28 661 A1 | 2/1985 |
| DE | 196 30 903 A1 | 2/1998 |
| DE | 100 13 186 A1 | 9/2001 |
| DE | 100 13 187 A1 | 10/2001 |
| DE | 10 2008 060 454 A1 | 6/2010 |
| EP | 0 126 299 A1 | 11/1984 |
| EP | 0 126 300 A1 | 11/1984 |
| EP | 0 355 443 A2 | 2/1990 |
| EP | 0 403 921 A2 | 12/1990 |
| WO | WO 2004/076519 A1 | 9/2004 |
| WO | WO 2004/076520 A1 | 9/2004 |
| WO | WO 2005/087828 A1 | 9/2005 |
| WO | WO 2005/089085 A2 | 9/2005 |
| WO | WO 2007/039133 A1 | 4/2007 |
| WO | WO 2008/068198 A1 | 6/2008 |
| WO | WO 2008/116893 A1 | 10/2008 |
| WO | WO 2008/116894 A1 | 10/2008 |

(Continued)

OTHER PUBLICATIONS

European Search Report dated Mar. 24, 2017 in European Patent Application No. 16192847.8 (with English Translation of Category of Cited Documents), 4 pages.
International Preliminary Report on Patentability and Written Opinion dated Apr. 9, 2019 in PCT/EP2017/074934 (English Translation only), 7 pages.
U.S. Appl. No. 15/567,827, filed Oct. 19, 2017, US 2018-0086938 A1, Harald Schaefer, et al.
U.S. Appl. No. 16/339,124, filed Apr. 3, 2019, Harald Schaefer, et al.
International Search Report dated Dec. 1, 2017 in PCT/EP2017/074934 filed on Oct. 2, 2017.

*Primary Examiner* — Rabon A Sergent

(74) *Attorney, Agent, or Firm* — Faegre Drinker Biddle & Reath LLP

(57) ABSTRACT

The present invention relates to a novel process for preparing isocyanurate-comprising polyisocyanates of (cyclo)aliphatic diisocyanates that are especially stable to color drift in solvents.

19 Claims, No Drawings

(56) References Cited

FOREIGN PATENT DOCUMENTS

WO     WO 2008/116895 A1    10/2008
WO     WO 2013/060614 A1     5/2013

\* cited by examiner

COLOUR-STABLE CURING COMPOSITIONS CONTAINING POLYISOCYANATES OF (CYCLO)ALIPHATIC DIISOCYANATES

The present invention relates to novel color drift-stable compositions comprising polyisocyanates of (cyclo)aliphatic diisocyanates.

U.S. Pat. No. 6,376,584 B1 describes various stabilizers for use in polyurethane compositions, in which polyisocyanates are reacted with polyols in the presence of dibutyltin dilaurate.

There is no disclosure of the stability problems that arise when polyisocyanate compositions are mixed with a catalyst and stored.

U.S. Pat. No. 7,122,588 B2 describes coatings, including polyurethane coatings, stabilized with esters of hypophosphorous acid to improve lifetime and to counter discoloration.

There is no disclosure of the stability problems that arise when polyisocyanate compositions are mixed with a catalyst and stored. Moreover, the stabilization described therein is still inadequate, and so there continues to be a need for improved stabilization.

DE 19630903 describes the stabilization of isocyanates with the aid of various phosphorus compounds and sterically hindered phenols.

There is no description in each case of the presence of catalysts for the reaction between isocyanate groups and groups reactive toward them.

WO 2005/089085 describes polyisocyanate compositions as curing agents for two component (2K) polyurethane coatings which, as well as a catalyst for the reaction between isocyanate groups and groups reactive toward them, comprises a stabilizer mixture selected from sterically hindered phenols and secondary arylamines, and also trialkyl/aryl phosphites. There is explicit disclosure in the examples of a polyisocyanate composition, the isocyanurate Tolonate HDT, with dibutyltin dilaurate as catalyst in butyl acetate/methyl amyl ketone/xylene 1:1:0.5.

Sterically hindered phenols mentioned are 2,4-dimethyl-6-butylphenol, 4,4'-methylenebis(2,6-di-tert-butylphenol), 2,6-di-tert-butyl-N,N'-dimethylamino-p-cresol, butylated hydroxyanisole, 2,6-di-tert-butylphenol, 2,4,6-tri-tert-butylphenol, 2-tert-butylphenol, 2,6-diisopropylphenol, 2-methyl-6-tert-butylphenol, 2,4-dimethyl-6-tert-butylphenol, 4-(N,N-dimethylaminomethyl)-2,6-di-tert-butylphenol, 4-ethyl-2,6-di-tert-butylphenol. In the examples, BHT (3,5-bis(tert-butyl)-4-hydroxytoluene) is used in combination with aliphatic trialkyl phosphites throughout.

The product mixtures described in patent specifications WO 2008/116893, WO 2008/116894, WO 2008/116895 comprise polyisocyanate, Lewis acid, secondary antioxidant such as thioether (WO 2008/116893), phosphonite (WO 2008/116895) or phosphonate (WO 2008/116894), and optionally sterically hindered phenol, acidic stabilizers and coatings additives.

WO 2013/060614 gives an analogous description of polyisocyanate compositions comprising polyisocyanate, Lewis-acidic organic metal compound capable of accelerating the reaction of isocyanate groups with isocyanate-reactive groups, a Bronsted acid having a pKa less than 4, sterically hindered phenol, solvent and optionally coatings additives.

In all the present patent applications, the improvement in color drift stability on storage of polyisocyanates in the presence of Lewis acid(s) and solvent(s) is not sufficiently good.

DE 10 2008 060454 A1 to BASF Coatings describes, in claim 1, coating compositions comprising (a) hydroxyl-containing compound (A), (b) at least one saturated compound (B) having free and/or blocked isocyanate groups and containing at least partly hydrolyzable silane groups, and (c) at least one catalyst (D) for the crosslinking of silane groups, wherein the coating composition comprises, as hydroxyl-containing compound (A), at least one hyperbranched, dendritic hydroxy-functional polyester in which on average at least one hydroxyl function of the polyester is esterified with at least one acid selected from the group of the isomeric C8 to C9 monocarboxylic acids. Claim 9 describes coating compositions, wherein the catalyst is phosphorus-containing and/or wherein catalysts (D) are selected from the group of the substituted phosphonic diesters and/or diphosphonic diesters, substituted phosphoric monoesters and/or phosphoric diesters, preferably from the group consisting of acyclic phosphoric diesters and/or cyclic phosphoric diesters, and/or the corresponding amine-blocked phosphoric esters. An example given of a blocked phosphoric ester is Nacure® 4167. According to table 2, it is added to the polyisocyanate-reactive composition. The catalysts for the silane crosslinking are preferably used in proportions of 0.01% to 20% by weight, more preferably in proportions of 0.1% to 10% by weight, based on the nonvolatile constituents of the coating composition of the invention. The examples describe amounts use amount of >3.3% Nacure® 4167 per modified polyisocyanate, corresponding to >1.1% pure amine*phosphate per modified polyisocyanate. The features of the coatings include good appearance, good undulation, and good scratch resistance.

There is no description of the use of amine-blocked phosphates or amine-blocked phosphonates for stabilization of isocyanate compositions to color drift in the presence of Lewis acid, especially in the absence of silane compounds. The amounts of amine-blocked phosphates or amine-blocked phosphonates are significantly higher than those used in this application for color drift stabilization.

DE 3328661 describes the use of ammonium salts of mono- or polyfunctional primary, secondary and/or tertiary amines with alkylating esters of acids of phosphorus in an equivalent ratio of 1:1 as latent, heat-activatable catalysts for the reaction of aromatic polyisocyanates with polyols for adhesives and cast elastomers. Catalyst example 3 comprises triethylamine*dibutyl phosphate. In use example 1, this is used at 2% based on polyisocyanate.

It was an object of the present invention to provide further storage-stable polyisocyanate compositions which already comprise a catalyst for the reaction between isocyanate groups and groups reactive therewith and are color-stable, and the stabilizing effect of which is better than the prior art. The stabilizing effect should be independent of the origin of the monomeric isocyanate. In addition, the additive should not have any adverse effects in combination with Lewis acids.

The object was achieved by polyisocyanate compositions comprising
  (A) at least one polyisocyanate obtainable by reacting at least one monomeric isocyanate,
  (B) at least one salt in an amount of 10 to 300 ppm by weight, based on component (A), consisting of (B1) a phosphorus-containing acidic compound and (B2) an open-chain trisubstituted amine,
  (C) at least one sterically hindered phenol,
  (D) optionally at least one further (secondary) antioxidant, (E) at least one Lewis-acidic organic metal compound capable of accelerating the reaction of isocyanate groups with isocyanate-reactive groups,
(F) at least one solvent,
(G) optionally other coatings additives.

Polyisocyanate compositions of this kind have good color stability over time in the course of storage (low "color drift") and can be reacted with compositions comprising isocyanate-reactive groups in polyurethane coatings.

The monomeric isocyanates used may be aromatic, aliphatic or cycloaliphatic, preferably aliphatic or cycloaliphatic, which is referred to for short in this text as (cyclo)aliphatic; aliphatic isocyanates are particularly preferred.

Aromatic isocyanates are those which comprise at least one aromatic ring system, i.e. both purely aromatic and araliphatic compounds.

Cycloaliphatic isocyanates are those which comprise at least one cycloaliphatic ring system.

Aliphatic isocyanates are those which comprise exclusively linear or branched chains, in other words acyclic compounds.

The monomeric isocyanates are preferably diisocyanates bearing exactly two isocyanate groups. They can, however, in principle also be monoisocyanates, having one isocyanate group.

In principle, higher isocyanates having an average of more than 2 isocyanate groups are also an option. Suitable examples of these include triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenating corresponding aniline/formaldehyde condensates and constitute polyphenyl polyisocyanates having methylene bridges.

These monomeric isocyanates do not contain any substantial products of reaction of the isocyanate groups with themselves.

The monomeric isocyanates are preferably isocyanates having 4 to 20 carbon atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate (e.g. methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di-(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane, and also 3(or 4), 8(or 9)-bis-(isocyanatomethyl)tricyclo[5.2.1.0$^{2.6}$]decane isomer mixtures, and also aromatic diisocyanates such as tolylene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3 methyldiphenylmethane 4,4'-diisocyanate, tetramethylxylylene diisocyanate, 1,4 diisocyanatobenzene or diphenyl ether 4,4'-diisocyanate.

Particular preference is given to hexamethylene 1,6-diisocyanate, pentamethylene 1,5-diisocyanate, 1,3-bis(isocyanatomethyl)cyclohexane, isophorone diisocyanate and 4,4'- or 2,4'-di(isocyanatocyclohexyl)methane, very particular preference to isophorone diisocyanate and hexamethylene 1,6-diisocyanate, especial preference to hexamethylene 1,6-diisocyanate.

It is also possible for mixtures of the isocyanates mentioned to be present.

Isophorone diisocyanate is usually in the form of a mixture, specifically a mixture of the cis and trans isomers, generally in a proportion of about 60:40 to 90:10 (w/w), preferably of 70:30-90:10.

Dicyclohexylmethane 4,4'-diisocyanate may likewise be in the form of a mixture of the different cis and trans isomers.

For the present invention it is possible to use not only those diisocyanates which are obtained by phosgenating the corresponding amines but also those which are prepared without the use of phosgene, i.e. by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates, such as hexamethylene 1,6-diisocyanate (HDI), isomeric aliphatic diisocyanates having 6 carbon atoms in the alkylene radical, 4,4'- or 2,4'-di (isocyanatocyclohexyl)methane, and 1-isocyanato-3 isocyanatomethyl-3,5,5-trimethylcyclohexane (isophorone diisocyanate or IPDI), can be prepared by reacting the (cyclo)aliphatic diamines with, for example, urea and alcohols to give (cyclo)aliphatic biscarbamic esters and subjecting said esters to thermal cleavage into the corresponding diisocyanates and alcohols. The synthesis is usually effected continuously in a circulation process and optionally in the presence of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention, the isocyanates used contain less than 100 ppm by weight of hydrolyzable chlorine, preferably less than 50 ppm by weight, particularly less than 30 ppm by weight and especially less than 20 ppm by weight. This can be measured, for example, by ASTM method D4663-98. The contents of total chlorine are, for example, below 1000 ppm by weight, preferably below 800 ppm by weight and more preferably below 500 ppm by weight (determined by argentometric titration after hydrolysis).

It is of course also possible to use mixtures of those monomeric isocyanates which have been obtained by reaction of the (cyclo)aliphatic diamines with, for example, urea and alcohols and cleavage of the (cyclo)aliphatic biscarbamic esters obtained with those diisocyanates which have been obtained by phosgenation of the corresponding amines.

The polyisocyanates (A), which can be formed by oligomerizing the monomeric isocyanates, are generally characterized as follows:

The mean NCO functionality of such compounds is generally at least 1.8 and may be up to 8, preferably 2 to 5, and more preferably 2.4 to 4.

The content of isocyanate groups after oligomerization, calculated as NCO=42 g/mol, is generally 5% to 25% by weight, unless indicated otherwise.

Preferably, the polyisocyanates (A) are the following compounds:
1) Polyisocyanates which have isocyanurate groups and derive from aromatic, aliphatic and/or cycloaliphatic diisocyanates. Particular preference here is given to the corresponding aliphatic and/or cycloaliphatic isocyanato-isocyanurates and in particular to those based on hexamethylene diisocyanate and isophorone diisocyanate. The isocyanurates present are, in particular, tris (isocyanatoalkyl) and/or tris(isocyanatocycloalkyl) isocyanurates, which constitute cyclic trimers of the diisocyanates, or are mixtures with their higher homologs having more than one isocyanurate ring. The isocyanatoisocyanurates generally have an NCO content of 10 to 30% by weight, in particular 15 to 25% by weight, and an average NCO functionality of 2.6 to 8. The polyisocyanates having isocyanurate groups may, to a smaller degree, also comprise urethane and/or allophanate groups, preferably with a content of bound alcohol of less than 2%, based on the polyisocyanate.

2) Polyisocyanates having uretdione groups, with aromatically, aliphatically and/or cycloaliphatically bonded isocyanate groups, preferably aliphatically and/or cycloaliphatically bonded, and in particular those derived from hexamethylene diisocyanate or isophorone diisocyanate. Uretdione diisocyanates are cyclic dimerization products of diisocyanates.

The polyisocyanates having uretdione groups are frequently obtained in a mixture with other polyisocyanates, especially those mentioned under 1).

Polyisocyanates having uretdione groups typically have functionalities of 2 to 3. This also includes uretdione/isocyanurate mixtures of any composition, especially with a content of monomeric uretdione (dimer) of 1-40%, especially 3-15%, especially 5-10%.

To this end, the diisocyanates are converted under reaction conditions under which both uretdione groups and the other polyisocyanates are formed, or the uretdione groups are formed first and these are subsequently converted to the other polyisocyanates, or the diisocyanates are first converted to the other polyisocyanates and these are then converted to products containing uretdione groups.

3) Biuret group-containing polyisocyanates having aromatically, cycloaliphatically or aliphatically bonded, preferably cycloaliphatically or aliphatically bonded, isocyanate groups, especially tris(6-isocyanatohexyl) biuret or mixtures thereof with higher homologs thereof. These polyisocyanates having biuret groups generally have an NCO content of 18% to 24% by weight and an average NCO functionality of 2.8 to 6.

4) Urethane and/or allophanate group-containing polyisocyanates having aromatically, aliphatically or cycloaliphatically bonded, preferably aliphatically or cycloaliphatically bonded, isocyanate groups, as, for example, by reaction of excess amounts of diisocyanate, for example hexamethylene diisocyanate or isophorone diisocyanate, with mono- or polyhydric alcohols. These polyisocyanates having urethane and/or allophanate groups generally have an NCO content of 12% to 24% by weight and an average NCO functionality of 2.0 to 4.5. Such urethane and/or allophanate group-containing polyisocyanates may be prepared without catalysis or preferably in the presence of catalysts, for example ammonium carboxylates or hydroxides, or allophanatization catalysts, for example bismuth, cobalt, cesium, Zn(II) or Zr(IV) compounds, in each case in the presence of monohydric, dihydric or polyhydric, preferably monohydric, alcohols.

These polyisocyanates having urethane and/or allophanate groups frequently occur in mixed forms with the polyisocyanates mentioned under 1).

5) Polyisocyanates comprising oxadiazinetrione groups, derived preferably from hexamethylene diisocyanate or isophorone diisocyanate. Such polyisocyanates comprising oxadiazinetrione groups are obtainable from diisocyanate and carbon dioxide.

6) Polyisocyanates comprising iminooxadiazinedione groups, derived preferably from hexamethylene diisocyanate or isophorone diisocyanate. Such polyisocyanates comprising iminooxadiazinedione groups are preparable from diisocyanates by means of specific catalysts.

7) Uretonimine-modified polyisocyanates.

8) Carbodiimide-modified polyisocyanates.

9) Hyperbranched polyisocyanates, of the kind known for example from DE-A1 10013186 or DE-A1 10013187.

10) Polyurethane-polyisocyanate prepolymers, from di- and/or polyisocyanates with alcohols.

11) Polyurea-polyisocyanate prepolymers.

12) The polyisocyanates 1)-11), preferably 1), 3), 4) and 6), after preparation thereof, can be converted to biuret group-containing or urethane/allophanate group-containing polyisocyanates having aromatically, cycloaliphatically or aliphatically bonded, preferably (cyclo)aliphatically bonded, isocyanate groups. Biuret groups are formed, for example, by addition of water or reaction with amines. Urethane and/or allophanate groups are formed by reaction with monohydric, dihydric or polyhydric, preferably monohydric, alcohols, optionally in the presence of suitable catalysts. These biuret or urethane/allophanate group-containing polyisocyanates generally have an NCO content of 10% to 25% by weight and an average NCO functionality of 3 to 8.

13) Hydrophilically modified polyisocyanates, i.e. polyisocyanates which, as well as the groups described under 1-12, comprise those which arise in a formal sense through addition of molecules having NCO-reactive groups and hydrophilizing groups onto the isocyanate groups of the above molecules. The latter are nonionic groups such as alkyl polyethylene oxide and/or ionic groups derived from phosphoric acid, phosphonic acid, sulfuric acid or sulfonic acid, or salts thereof.

14) Modified polyisocyanates for dual-cure applications, i.e. polyisocyanates which, as well as the groups described under 1-11, comprise those which arise in a formal sense through addition of molecules having NCO-reactive groups and groups crosslinkable by UV or actinic radiation onto the isocyanate groups of the above molecules. These molecules are, for example, hydroxyalkyl (meth)acrylates and other hydroxyl-vinyl compounds.

The diisocyanates or polyisocyanates listed above may also be at least partly in blocked form.

Classes of compound used for blocking are described in D. A. Wicks, Z. W. Wicks, Progress in Organic Coatings, 36, 148-172 (1999), 41, 1-83 (2001) and 43, 131-140 (2001).

Examples of classes of compound used for blocking are phenols, imidazoles, triazoles, pyrazoles, oximes, N-hydroxyimides, hydroxybenzoic esters, secondary amines, lactams, CH-acidic cyclic ketones, malonic esters or alkyl acetoacetates.

In a preferred embodiment of the present invention, the polyisocyanate is selected from the group consisting of isocyanurates, biurets, urethanes and allophanates, preferably from the group consisting of isocyanurates, urethanes and allophanates, and it is more preferably a polyisocyanate containing isocyanurate groups.

In a particularly preferred embodiment, the polyisocyanate comprises polyisocyanates which comprise isocyanurate groups and derive from hexamethylene 1,6-diisocyanate.

In a further preferred embodiment, the polyisocyanate is a mixture of polyisocyanates comprising isocyanurate groups, most preferably of hexamethylene 1,6-diisocyanate and isophorone diisocyanate.

In a particularly preferred embodiment, the polyisocyanate is a mixture comprising low-viscosity polyisocyanates, preferably polyisocyanates comprising isocyanurate groups, having a viscosity of 600-1500 mPa*s, especially below 1200 mPa*s, low-viscosity allophanates and/or urethanes having a viscosity of 200-1600 mPa*s, especially 600-1500 mPa*s, and/or polyisocyanates comprising iminooxadiazinedione groups.

In this specification, unless noted otherwise, the viscosity is reported at 23° C. in accordance with DIN EN ISO 3219/A.3 in a cone/plate system with a shear rate of 1000 s$^{-1}$.

The process for preparing the polyisocyanates may take place as described in WO 2008/68198, especially from page 20 line 21 to page 27 line 15 therein, which is hereby incorporated into the present application by reference.

The reaction can be discontinued, for example, as described therein from page 31 line 19 to page 31 line 31, and working up may take place as described therein from page 31 line 33 to page 32 line 40, which in each case is hereby part of the present application by reference.

The reaction can alternatively and preferably be effected as described in WO 2005/087828 for ammonium alpha-hydroxycarboxylate catalysts. The reaction can be stopped, for example, as described in WO 2005/087828 from page 11 line 12 to page 12 line 5, which is hereby incorporated into the present application by reference.

The reaction can alternatively be effected as described in CN 10178994A or CN 101805304.

In the case of thermally labile catalysts, it is additionally also possible to stop the reaction by heating the reaction mixture to a temperature above at least 80° C., preferably at least 100° C., more preferably at least 120° C. The heating of the reaction mixture is generally already sufficient for this purpose, as required for removal of the unconverted isocyanate by distillation in the workup.

In the case both of thermally non-labile catalysts and of thermally labile catalysts, it is possible to stop the reaction at relatively low temperatures by addition of deactivators. Examples of suitable deactivators are hydrogen chloride, phosphoric acid, organic phosphates, such as dibutyl phosphate or diethylhexyl phosphate, and carbamates such as hydroxyalkyl carbamate.

These compounds are added neat or diluted in a suitable concentration as necessary to stop the reaction.

The salts (B) consist of (B1) a phosphorus-containing acidic compound and (B2) an open-chain amine.

Preferred phosphorus-containing acidic compounds (B1) are alkyl phosphates (B1a), phosphonates (B1b) and mono-O-alkyl phosphonites (B1c). The compounds in the general formulae (I) to (V) are shown by way of example:

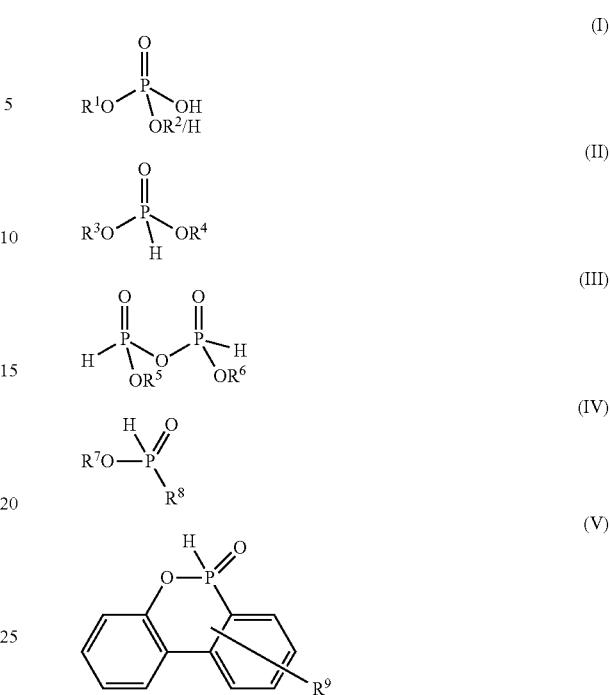

Alkyl phosphates (B1a) are, for example, mono- and di-$C_1$- to $C_{18}$-alkyl phosphates and mixtures thereof, preferably those with $C_1$- to $C_8$-alkyl groups, most preferably with $C_2$- to $C_8$-alkyl groups and especially those with $C_4$- to $C_8$-alkyl groups, and mixtures thereof.

Examples of alkyl groups in mono- and dialkyl phosphates are methyl, ethyl, isopropyl, n-propyl, n-butyl, isobutyl, sec-butyl, tert-butyl, n-pentyl, n-hexyl, n-heptyl, n-octyl, isooctyl, 2-ethylhexyl, n-decyl, 2-propylheptyl, n-dodecyl, tridecyl, isotridecyl, tetradecyl, pentadecyl, hexadecyl, heptadecyl, octadecyl, and isooctadecyl. Preferably, the phosphoric acid derivatives do not have any substituents other than alkyl substituents, especially any polar substituents, especially any groups having heteroatoms such as ethers or tertiary amines, or oligomers and polymers thereof. Heteroatoms are understood by the person skilled in the art to mean all atoms apart from carbon and hydrogen. Heteroatoms are, for example, nitrogen, oxygen, sulfur, phosphorus, bromine and chlorine.

The alkyl groups in dialkyl phosphates may be the same or different; they are preferably the same.

Mixtures of mono- and dialkyl phosphates may comprise the same groups as the mono- or dialkyl phosphates, for example ethyl, isopropyl, butyl, 2-ethylhexyl groups. The alkyl groups are preferably the same.

Further examples are Nacure® 4000 (formerly Nacure® C 207) and Nacure® 4054, otherwise undefined alkyl phosphates from King Industries, and Cycat® 296-9, an otherwise undefined alkyl phosphate, from Cytec.

Phosphonates (B1b) are low-valency phosphorus compounds with acidic character, especially dialkyl phosphonates and dialkyl diphosphonates for example.

Examples of these are mono- and di-$C_1$- to $C_{12}$-alkyl phosphonates and mixtures thereof. Examples of $C_1$- to $C_{12}$-alkyl groups are methyl, ethyl, isopropyl, n-propyl, n-butyl, isobutyl, sec-butyl, tert-butyl, n-hexyl, n-heptyl, n-octyl, n-decyl, n-dodecyl, 2-ethylhexyl and 2-propylheptyl. Preference is given to dialkyl phosphonates, more preferably those with $C_1$ to $C_8$-alkyl groups, most preferably those with $C_1$-, $C_2$-, $C_4$- or $C_8$-alkyl groups.

The alkyl groups in dialkyl phosphonates may be the same or different; they are preferably the same.

Preferred phosphonates are described in WO 2008/116895, particularly from page 10 line 38 to page 12 line 41, which is hereby incorporated into the present disclosure by reference. Specific examples include:

dioctyl phosphonate, di-n-octyl phosphonate Irgafos® OPH
di(2-ethylhexyl) phosphonate
dibutyl phosphonate Mono-O-alkyl phosphonites (B1c) are, for example, derivatives of 9,10-dihydro-9-oxa-10-phosphaphenanthrene 10-oxides (Sanko® HCA; DOPO). The carbons of the aromatic system may be substituted by further alkyl groups.

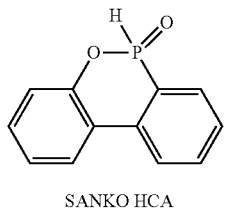 [SMILES: O=[PH]1Oc2ccccc2-c2ccccc21]

SANKO HCA

The phosphorus-containing acidic compounds (B1) preferably have a pKa of less than 4.

Open-chain trisubstituted amines (B2) are described as follows:

The open-chain trisubstituted amines (B2) in the context of this invention do not have any amine group in a cycle.

The open-chain trisubstituted amines B2 are preferably (cyclo)aliphatic amines of the general formula $NR_1R_2R_3$, in which
R1, R2, R3 may each independently be alkyl, cycloalkyl, hydroxyalkyl or alkyl ether, preferably alkyl or alkyl ether. Alkyl is preferably C1 to C18, more preferably C2 to C13. Alkyl is linear or branched. Branched alkyl groups are, for example, isoalkyl, 2-ethylhexyl, isopropylheptyl. Cycloalkyl is preferably a derivative of the cyclohexyl group, preferably cyclohexyl. The alkyl groups may be the same or different, the latter, for example, in N,N-dimethylcyclohexylamine, dimethylethylamine, dimethylpropylamine, dimethylisopropylamine.

The open-chain trisubstituted amines (B2) may comprise further functional groups, such as alcohol or ether groups, but not preferred.

Preferred open-chain trisubstituted amines (B2) are triethylamine, N,N-dimethylcyclohexylamine and N,N-dimethylethanolamine.

The open-chain trisubstituted amines (B2) may also be diamines such as N,N,N',N'-tetramethylpropane-1,3-diamine and N,N-diethyl-N',N'-dimethylpropane-1,3-diamine, or triamines, e.g. N,N,N',N'',N''-pentamethyldiethylenetriamine. More preferably, the open-chain trisubstituted amines (B2) have exactly one amine group.

Trisubstituted cycloaliphatic amines having at least one amine group in at least one cycle, such as 1,4-diazabicyclo[2.2.2]octane or diazabicycloundecane, as used with preference as catalysts for the urethane formation reaction, are not open-chain amines in the context of the invention, but may be present independently thereof in their function as catalyst.

Open-chain trisubstituted amines in the context of this invention are not sterically hindered cyclic amines (often also referred to as HALS or HAS compounds; hindered amine (light) stabilizers) such as 2,2,6,6-tetramethylpiperidine, 2,6-di-tert-butylpiperidine and/or derivatives thereof, for example bis(2,2,6,6-tetra-methyl-4-piperidyl) sebacate (Tinuvin® 770) (disubstituted amine)

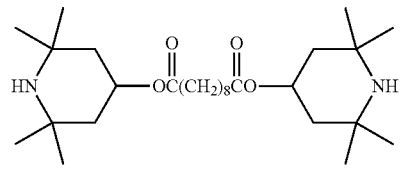

or mixtures of bis(1,2,2,6,6-pentamethyl-4-piperidinyl) sebacate and 1-methyl-8-(1,2,2,6,6-pentamethyl-4-piperidinyl) sebacate (Tinuvin® 292).

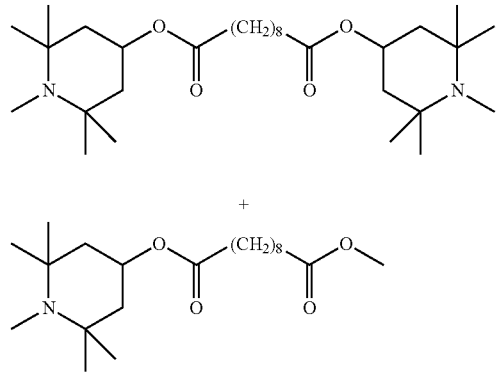

These are available, for example, as Tinuvin® and Chimassorb® brands from BASF SE and may be used in another function as light stabilizers independently of this invention.

Preferably, the pKa of the acid in aqueous solution corresponding first to the open-chain trisubstituted amines (B2) is between 5 and 14 (25° C.), more preferably between 8.5 and 12, most preferably between 9.5 and 11.0.

pKa values of the corresponding acids in aqueous solution at 25° C.:

| | |
|---|---|
| tridecanamine: | 10.6 (25° C.) |
| triethylamine: | 11.0 (25° C.) |
| trimethylamine: | 9.8 (25° C.) |
| benzyldimethylamine | 8.9 (20° C.) |
| N,N-dimethylcyclohexylamine | 10.0 (20° C.) |

Salts (B) consisting of (B2) and (B1) are, for example, the combinations of hexadecylphosphocholine, triethylamine, N,N-dimethylcyclohexylamine or N,N-dimethylethanolamine with dibutyl phosphate, diethylhexyl phosphate, butyl phosphate (CAS 12788-93-1) with variable ratios of butanol to phosphoric acid; Hordaphos® MOB, Hordaphos® MDB, mixtures of mono-/dibutyl phosphate (Rhodafac® PA 80), or isotridecyl phosphate (Orator) AP24), or directly in salt form, for example as active component, diluted with solvent, in Nacure® 4167 or Nacure® 4575.

The solubility of the salts (B) in the nonpolar polyisocyanates is limited; for example, 400 ppm by weight of Nacure® 4167 (about 35-40%, corresponding to about ~150 ppm by weight of salt B) is not fully soluble in pure isocyanurate.

The salts (B) are added in amounts, based on component (A), of 10 to 300, preferably 20 to 200 and more preferably 30 to 100 ppm by weight, even more preferably 30 to 80 ppm by weight, especially 30-60 ppm by weight.

Preferably, the phosphorus-containing acidic compound (B1) and the open-chain trisubstituted amine (B2) are used in a molar ratio of 1.2:0.8 to 0.5:1.5, more preferably of 1:1 to 0.8:1.2, most preferably stoichiometrically.

Sterically hindered phenols (C) in the context of the invention have the function of a primary antioxidant. This is typically understood by the person skilled in the art to mean compounds that scavenge free radicals.

Sterically hindered phenols of this kind are described, for example, in WO 2008/116894, preferably the compounds described from page 14 line 10 to page 16 line 10 therein, which is hereby incorporated into the present disclosure by reference.

These are preferably those phenols that have exactly one phenolic hydroxyl group on the aromatic ring, and more preferably those that have a substituent, preferably an alkyl group, in the ortho positions, most preferably in the ortho and para positions, to the phenolic hydroxyl group, especially alkyl 3-(3,5-di-tert-butyl-4-hydroxyphenyl)propionates, or substituted alkyl derivatives of such compounds.

Such phenols may also be constituents of a polyphenolic system with multiple phenol groups pentaerythritol tetrakis (3-(3,5-di-tert-butyl-4-hydroxyphenyl)propionate (e.g. Irganox® 1010); ethylenebis(oxyethylene) bis(3-(5-tert-butyl-4-hydroxy-m-tolyl)propionate) (e.g. Irganox® 245); 3,3',3'',5,5',5''-hexa-tert-butyl-α,α',α''-(mesitylene-2,4,6-triyl)tri-p-cresol (e.g. Irganox® 1330); 1,3,5-tris(3,5-di-tert-butyl-4-hydroxybenzyl)-1,3,5-triazine-2,4,6(1H,3H,5H)-trione (e.g. Irganox® 3114), each products from Ciba Spezialitätenchemie, now BASF SE.

Corresponding products are available, for example, under the following trade names: Irganox® (BASF SE), Sumilizer® from Sumitomo, Lowinox® from Great Lakes, Cyanox® from Cytec.

Other possible examples are thiodiethylene bis[3-[3,5-di-tert-butyl-4-hydroxyphenyl]propionate] (Irganox® 1035) and 6,6'-di-tert-butyl-2,2'-thiodi-p-cresol (e.g. Irganox® 1081), each BASF SE products.

Preference is given to 2,6-di-tert-butyl-4-methylphenol (BHT); isooctyl 3-(3,5-di-tert-butyl-4-hydroxyphenyl)propionate (Irganox® 1135, CAS No. 146598-26-7), octadecyl 3-(3,5-di-tert-butyl-4-hydroxyphenyl)propionate (Irganox® 1076, CAS No. 2082-79-3) and pentaerythritol tetrakis(3-(3,5-di-tert-butyl-4-hydroxyphenyl)propionate (CAS No. 6683-19-8; e.g. Irganox® 1010).

The secondary antioxidants (D) are preferably selected from the group consisting of phosphites, phosphonites, phosphonates and thioethers.

Phosphites are compounds of the $P(OR^a)(OR^b)(OR^c)$ type with $R^a$, $R^b$, $R^c$ as identical or different aliphatic or aromatic radicals (which may also form cyclic or spiro structures).

Preferred phosphonites are described in WO 2008/116894, particularly from page 11 line 8 to page 14 line 8 therein, which is hereby incorporated into the present disclosure by reference.

Phosphonates correspond to the compounds (B1b) and have a twin function as secondary antioxidant (D) and acid (B1) of the salt (B).

Preferred thioethers are described in WO 2008/116893, particularly from page 11 line 1 to page 15 line 37 therein, which is hereby incorporated into the present disclosure by reference.

Examples of useful Lewis-acidic organic metal compounds (E) include tin compounds, such as tin(II) salts of organic carboxylic acids, e.g. tin(II) diacetate, tin(II) dioctoate, tin(II) bis(ethylhexanoate) and tin(II) dilaurate, and the dialkyltin(IV) salts of organic carboxylic acids, e.g. dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate.

Further preferred Lewis-acidic organic metal compounds are zinc salts, for example zinc(II) diacetate and zinc(II) dioctoate.

Tin- and zinc-free alternatives used include organic metal salts of bismuth, zirconium, titanium, aluminum, iron, manganese, nickel and cobalt.

These are, for example, zirconium tetraacetylacetonate (e.g. K-KAT® 4205 from King Industries); zirconium dionates (e.g. K-KAT® XC-9213; XC-A 209 and XC-6212 from King Industries); bismuth compounds, more particularly tricarboxylates (e.g. K-KAT® 348, XC-B221; XC-C227, XC 8203 from King Industries); aluminum dionate (e.g. K-KAT® 5218 from King Industries). Tin-free and zinc-free catalysts are otherwise also offered, for example, under the trade name Borchi® Kat from Borchers, TK from Goldschmidt or BICATO from Shepherd, Lausanne.

Bismuth and cobalt catalysts, cerium salts such as cerium octoates, and cesium salts may also be used as catalysts.

Bismuth catalysts are especially bismuth carboxylates, especially bismuth octoates, ethylhexanoates, neodecanoates or pivalates; for example K-KAT 348 and XK-601 from King Industries, TIB KAT 716, 716LA, 716XLA, 718, 720, 789 from TIB Chemicals and those from Shepherd Lausanne, and catalyst mixtures of, for example, bismuth and zinc organyls.

Further metal catalysts are described by Blank et al. in Progress in Organic Coatings, 1999, vol. 35, pages 19-29.

These catalysts are suitable for solvent-based, water-based and/or blocked systems.

Molybdenum catalysts, tungsten catalysts and vanadium catalysts are described especially for the conversion of blocked polyisocyanates in WO 2004/076519 and WO 2004/076520.

Cesium salts as well can be used as catalysts. Suitable cesium salts include compounds employing the following anions: $F^-$, $Cl^-$, $ClO^-$, $ClO_3^-$, $ClO_4^-$, $Br^-$, $I^-$, $IO^{31}$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and $(C_{n+1}H_{2n-2}O_4)^{2-}$, where n represents the numbers 1 to 20. Preference is given to cesium carboxylates in which the anion obeys the formulae $(C_nH_{2n-1}O_2)^-$ and $(C_{n+1}H_{2n-2}O_4)^{2-}$ where n is 1 to 20. Particularly preferred cesium salts have, as anions, monocarboxylates of the general formula $(C_nH_{2n-1}O_2)^-$ where n represents the numbers 1 to 20. In this connection, particular mention should be made of formate, acetate, propionate, hexanoate and 2-ethylhexanoate.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zinc(II) diacetate, zinc(II) dioctoate, zirconium acetylacetonate and zirconium 2,2,6,6-tetramethyl-3,5-heptanedionate, and bismuth compounds.

Particular preference is given to dibutyltin dilaurate.

In addition, a solvent or solvent mixture (F) is also present.

Solvents usable for the polyisocyanate composition, and also for the binder components and any other components, are those solvents that do not have any groups reactive toward isocyanate groups or capped isocyanate groups and in which the polyisocyanates are soluble to an extent of at least 10% by weight, preferably to an extent of at least 25%, more preferably to an extent of at least 50%, even more preferably to an extent of at least 75%, particularly to an extent of at least 90% and especially to an extent of at least 95% by weight.

Examples of such solvents are aromatic (including alkylated benzenes and naphthalenes) and/or (cyclo)aliphatic hydrocarbons and mixtures thereof, chlorinated hydrocarbons, ketones, esters, alkoxylated alkyl alkanoates, ethers, or mixtures of the solvents.

Preferred aromatic hydrocarbon mixtures are those that comprise predominantly aromatic $C_7$ to $C_{14}$ hydrocarbons and may encompass a boiling range from 110° C. to 300° C., particular preference being given to toluene, o-, m- or p-xylene, trimethylbenzene isomers, tetramethylbenzene isomers, ethylbenzene, cumene, tetrahydronaphthalene and mixtures comprising these compounds.

Examples include the Solvesso® range from ExxonMobil Chemical, particularly Solvesso® 100 (CAS-No. 64742-95-6, predominantly $C_9$ and $C_{10}$-aromatics, boiling range about 154° C.-178° C.), 150 (boiling range about 182° C.-207° C.) and 200 (CAS-No. 64742-94-5), and also the Shellsole range from Shell, Caromax® (e.g. Caromax® 18) from Petrochem Carless and Hydrosol from DHC (e.g. Hydrosol® A 170). Hydrocarbon mixtures composed of paraffins, cycloparaffins and aromatics are also commercially available under the Kristalloel (for example Kristalloel 30, boiling range about 158-198° C. or Kristalloel 60: CAS No. 64742-82-1), white spirit (for example likewise CAS No. 64742-82-1) or Solvent naphtha (light: boiling range about 155-180° C., heavy: boiling range about 225-300° C.) trade names. The aromatics content of such hydrocarbon mixtures is generally more than 90 wt %, preferably more than 95 wt %, particularly preferably more than 98 wt % and very particularly preferably more than 99 wt %. It may be advantageous to use hydrocarbon mixtures having a particularly reduced content of naphthalene.

(Cyclo)aliphatic hydrocarbons include for example decalin, alkylated decalin and isomer mixtures of linear or branched alkanes and/or cycloalkanes.

The content of aliphatic hydrocarbons is generally less than 5%, preferably less than 2.5% and more preferably less than 1% by weight.

Esters are, for example, n-butyl acetate, ethyl acetate, 1-methoxy-2-propyl acetate and 2-methoxyethyl acetate.

Ethers are, for example, THF, dioxane and the dimethyl, -ethyl or -n-butyl ethers of ethylene glycol, diethylene glycol, triethylene glycol, propylene glycol, dipropylene glycol or tripropylene glycol.

Ketones are, for example, acetone, diethyl ketone, ethyl methyl ketone, isobutyl methyl ketone, methyl amyl ketone and tert-butyl methyl ketone.

It is also possible for alcohols to be used in a small amount as solvents, for example when they are of better suitability as solvents for the polar salts (B).

Preferred solvents are n-butyl acetate, ethyl acetate, 1-methoxy-2-propyl acetate, 2-methoxyethyl acetate, and mixtures thereof, especially with the above-detailed aromatic hydrocarbon mixtures, especially xylene and Solvesso® 100.

Mixtures of this kind may be created in a volume ratio of 5:1 to 1:5, preferably in a volume ratio of 4:1 to 1:4, more preferably in a volume ratio of 3:1 to 1:3 and most preferably in a volume ratio of 2:1 to 1:2.

Preferred examples are butyl acetate/xylene, methoxypropyl acetate/xylene 1:1, butyl acetate/Solvent naphtha 100 1:1, butyl acetate/Solvesso® 100 1:2 and Kristalloel 30/Shellsole A 3:1.

Preference is given to butyl acetate, 1-methoxy-2-propyl acetate, methyl amyl ketone, xylene and Solvesso® 100.

The solvents are problematic to different degrees in relation to the objective.

Polyisocyanate compositions according to the patent that comprise ketones or aromatic mixtures (for example Solvent Naphtha mixtures) are particularly critical in relation to color number development in the course of storage. By contrast, esters, ethers, comparatively narrow aromatic cuts such as xylene and isomer mixtures thereof are less problematic. This is surprising in that xylenes, analogously to the aromatic mixtures, likewise bear benzylic hydrogen atoms that could be involved in color development. An additional factor is that Solvent Naphtha mixtures, depending on the source and storage times, can have distinctly different effects on color number drift when used in the polyisocyanate compositions.

In a preferred form, polyisocyanates (A) are provided in a blend with a salt (B) consisting of a phosphorus-containing acidic compound (B1) and an open-chain amine (B2), and sterically hindered phenol (C), and optionally a further antioxidant (D), in a first step for further processing.

These mixtures are then converted to the polyisocyanate compositions of the invention in a second step by adding any further components (B) to (G).

The polyisocyanate compositions of the invention are, for example, of the following composition:

(A) 20% to 95% by weight of polyisocyanate (A), preferably 30% to 90% by weight, more preferably 40% to 80% by weight, (B) 10 to 300 ppm by weight of salt (B), preferably 20 to 200 and more preferably 30 to 100 ppm by weight, (C) 20 to 2000 ppm by weight sterically hindered phenol (C), preferably 50 to 1000, more preferably 100-600, most preferably 100-300, (D) 20 to 1000 ppm by weight of a further antioxidant (D), preferably 50 to 600, more preferably 100 to 300 ppm by weight, and (E) 5 to 2000 ppm by weight of a Lewis-acidic compound (E), preferably 10-1000 ppm by weight, more preferably 20 to 300 ppm by weight, (F) 5-80% by weight of solvent (F), preferably 70 to 10% by weight, more preferably 60-20% by weight, with the proviso that the sum total of (A) and (F) is always 100% by weight and the ppm by weight figures are based on polyisocyanate (A), (G) optionally additional coatings additives in addition to components (A) to (F).

If components (G) are present, these are not included in the % figures for the composition of components (A) to (F).

The polyisocyanate compositions of the invention can advantageously be used as curing agent in addition to at least one binder in polyurethane coatings.

The reaction with binders can optionally be effected after a long period of time as required by corresponding storage of the polyisocyanate composition. The polyisocyanate composition is preferably stored at room temperature, but can also be stored at higher temperatures. In practice, heating of such polyisocyanate composition to 40° C., 60° C., or even to 80° C., is entirely possible.

The binders may, for example, be polyacrylate polyols, polyester polyols, polyether polyols, polyurethane polyols; polyurea polyols; polyester polyacrylate polyols; polyester polyurethane polyols; polyurethane polyacrylate polyols, polyurethane-modified alkyd resins; fatty acid-modified polyester polyurethane polyols, copolymers with allyl ethers, graft polymers of the substance groups mentioned with, for example, different glass transition temperatures, and mixtures of the binders mentioned.

Preference is given to polyacrylate polyols, polyester polyols and polyurethane polyols.

Preferred OH numbers, measured to DIN 53240-2 (potentiometric), are 40-350 mg KOH/g of solid resin for polyesters, preferably 80-180 mg KOH/g of solid resin, and 15-250 mg KOH/g of solid resin for polyacrylate polyols, preferably 80-160 mg KOH/g.

In addition, the binders may have an acid number to DIN EN ISO 3682 (potentiometric) up to 200 mg KOH/g, preferably up to 150 and more preferably up to 100 mg KOH/g.

Particularly preferred binders are polyacrylate polyols and polyesterols.

Polyacrylate polyols preferably have a molecular weight $M_n$ of at least 500 and more preferably at least 1200 g/mol. The molecular weight $M_n$ may in principle be unlimited at the upper end, preferably up to 50 000, more preferably up to 20 000 and even more preferably up to 10 000 g/mol, and especially up to 5000 g/mol.

The hydroxy-functional monomers (see below) are used in the copolymerization in such amounts as to result in the abovementioned hydroxyl numbers of the polymers, which generally correspond to a hydroxyl group content of the polymers of 0.5% to 8%, preferably 1% to 5%, by weight.

These are hydroxyl-containing copolymers of at least one hydroxyl-containing (meth)acrylate with at least one further polymerizable comonomer selected from the group consisting of alkyl (meth)acrylates, vinylaromatics, α, β-unsaturated carboxylic acids and other monomers.

Examples of alkyl (meth)acrylates include $C_1$-$C_{20}$-alkyl (meth)acrylates, vinylaromatics are those having up to 20 carbon atoms, α,β-unsaturated carboxylic acids also include the anhydrides thereof, and other monomers are, for example, vinyl esters of carboxylic acids comprising up to 20 carbon atoms, ethylenically unsaturated nitriles, vinyl ethers of alcohols comprising 1 to 10 carbon atoms and, less preferably, aliphatic hydrocarbons having 2 to 8 carbon atoms and 1 or 2 double bonds.

Preferred alkyl (meth)acrylates are those having a $C_1$-$C_{10}$-alkyl radical, such as methyl methacrylate, methyl acrylate, n-butyl acrylate, ethyl acrylate, and 2-ethylhexyl acrylate.

In particular, mixtures of the alkyl (meth)acrylates are also suitable.

Vinyl esters of carboxylic acids having 1 to 20 carbon atoms are, for example, vinyl laurate, vinyl stearate, vinyl propionate, and vinyl acetate.

Examples of possible α,β-unsaturated carboxylic acids and their anhydrides include acrylic acid, methacrylic acid, fumaric acid, crotonic acid, itaconic acid, maleic acid or maleic anhydride, preferably acrylic acid.

Hydroxy-functional monomers include monoesters of α,β-unsaturated carboxylic acids such as acrylic acid, methacrylic acid (referred to for short in this specification as "(meth)acrylic acid") with diols or polyols that have preferably 2 to 20 carbon atoms and at least two hydroxyl groups, such as ethylene glycol, diethylene glycol, triethylene glycol, 1,2-propylene glycol, 1,3-propylene glycol, 1,1-dimethylethane-1,2-diol, dipropylene glycol, triethylene glycol, tetraethylene glycol, pentaethylene glycol, tripropylene glycol, butane-1,4-diol, pentane-1,5-diol, neopentyl glycol, neopentyl glycol hydroxypivalate, 2-ethylpropane-1,3-diol, 2-methylpropane-1,3-diol, 2-butyl-2-ethylpropane-1,3-diol, hexane-1,6-diol, 2-methylpentane-1,5-diol, 2-ethylbutane-1,4-diol, 2-ethylhexane-1,3-diol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, poly-THF having a molecular weight between 162 and 4500, preferably 250 to 2000, poly-1,3-propanediol or polypropylene glycol having a molecular weight between 134 and 2000 or polyethylene glycol having a molecular weight between 238 and 2000.

Preference is given to 2-hydroxyethyl acrylate, 2-hydroxyethyl methacrylate, 2- or 3-hydroxypropyl acrylate, butane-1,4-diol monoacrylate or 3-(acryloyloxy)-2-hydroxypropyl acrylate, and particular preference to 2-hydroxyethyl acrylate and/or 2-hydroxyethyl methacrylate.

Examples of useful vinylaromatic compounds include vinyltoluene, α-butylstyrene, α-methylstyrene, 4-n-butylstyrene, 4-n-decylstyrene and, preferably, styrene.

Examples of nitriles include acrylonitrile and methacrylonitrile.

Examples of suitable vinyl ethers include vinyl methyl ether, vinyl isobutyl ether, vinyl hexyl ether, and vinyl octyl ether.

Nonaromatic hydrocarbons having 2 to 8 carbon atoms and one or two olefinic double bonds include butadiene, isoprene, and also ethylene, propylene, and isobutylene.

Additionally it is possible to use N-vinylformamide, N-vinylpyrrolidone, and N-vinylcaprolactam, and also ethylenically unsaturated acids, especially carboxylic acids, acid anhydrides or acid amides, and also vinylimidazole. Comonomers containing epoxide groups as well, such as glycidyl acrylate or methacrylate, for example, or monomers such as N-methoxymethylacrylamide or -methacrylamide, can be used additionally in small amounts.

Preference is given to esters of acrylic acid and/or of methacrylic acid having 1 to 18, preferably 1 to 8, carbon atoms in the alcohol residue, such as methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkyl-substituted styrenes, acrylonitrile, methacrylonitrile, vinyl acetate or vinyl stearate, or any desired mixtures of such monomers.

The monomers bearing hydroxyl groups are used, in the copolymerization of the (meth)acrylates bearing hydroxyl groups, in a mixture with other polymerizable monomers, preferably radically polymerizable monomers, preferably those which are composed to an extent of more than 50% by weight of $C_1$-$C_{20}$, preferably $C_1$-$C_4$, alkyl (meth)acrylate, (meth)acrylic acid, vinylaromatics having up to 20 carbon atoms, vinyl esters of carboxylic acids comprising up to 20 carbon atoms, vinyl halides, nonaromatic hydrocarbons having 4 to 8 carbon atoms and 1 or 2 double bonds, unsaturated nitriles, and mixtures thereof. Particularly preferred polymers are those which besides the monomers bearing hydroxyl groups are composed to an extent of more than 60% by weight of $C_1$-$C_{10}$-alkyl (meth)acrylates, styrene and its derivatives, or mixtures thereof.

The polymers can be prepared by polymerization, by conventional methods. Preferably the polymers are prepared in an emulsion polymerization or in organic solution. Continuous or discontinuous polymerization processes are possible. The discontinuous processes include the batch process and the feed process, the latter being preferred. In the feed process, the solvent is introduced as an initial charge, on its own or with a portion of the monomer mixture, this initial charge is heated to the polymerization temperature, the polymerization is initiated radically in the case of an initial monomer charge, and the remaining monomer mixture is metered in, together with an initiator mixture, in the course of 1 to 10 hours, preferably 3 to 6 hours. Subsequently, the batch is optionally reactivated, in order to carry out the polymerization to a conversion of at least 99%.

Further binders are, for example, polyester polyols as obtainable by condensation of polycarboxylic acids, especially dicarboxylic acids, with polyols, especially diols. In order to assure appropriate functionality of the polyester polyol for the polymerization, there is also some degree of use of triols, tetraols etc., and of triacids etc.

Polyester polyols are known, for example, from Ullmanns Enzyklopadie der technischen Chemie [Ullmann's Encyclopedia of Industrial Chemistry], 4th edition, vol. 19, p. 62 to 65. Preference is given to using polyester polyols obtained by reaction of dihydric alcohols with dibasic carboxylic acids. Instead of using free polycarboxylic acids, the polyester polyols may also be produced using the corresponding polycarboxylic anhydrides or the corresponding polycarboxylic esters of lower alcohols or mixtures thereof. The polycarboxylic acids may be aliphatic, cycloaliphatic, aromatic or heterocyclic and may be optionally substituted, for example by halogen atoms, and/or unsaturated. Examples thereof include:

oxalic acid, maleic acid, fumaric acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, maleic anhydride, dimeric fatty acids, their isomers and hydrogenation products, and also esterifiable derivatives, such as anhydrides or dialkyl esters, $C_1$-$C_4$-alkyl esters for example, preferably methyl, ethyl or n-butyl esters, of said acids are used. Preference is given to dicarboxylic acids of the general formula HOOC—$(CH_2)_y$—COOH where y is a number from 1 to 20, preferably an even number from 2 to 20; more preferably succinic acid, adipic acid, sebacic acid, and dodecanedicarboxylic acid.

Useful polyhydric alcohols for preparation of the polyesterols include propane-1,2-diol, ethylene glycol, 2,2-dimethylethane-1,2-diol, propane-1,3-diol, butane-1,2-diol, butane-1,3-diol, butane-1,4-diol, 3-methylpentane-1,5-diol, 2-ethylhexane-1,3-diol, 2,4-diethyloctane-1,3-diol, hexane-1,6-diol, polyTHF having a molar mass between 162 and 4500, preferably 250 to 2000, polypropane-1,3-diol having a molar mass between 134 and 1178, polypropane-1,2-diol having a molar mass between 134 and 898, polyethylene glycol having a molar mass between 106 and 458, neopentyl glycol, neopentyl glycol hydroxypivalate, 2-ethylpropane-1,3-diol, 2-methylpropane-1,3-diol, 2,2-bis(4-hydroxycyclohexyl)propane, cyclohexane-1,1-, -1,2-, 1,3-, and -1,4-dimethanol, cyclohexane-1,2-, -1,3- or -1,4-diol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt, which if appropriate may have been alkoxylated as described above.

Preferred alcohols are those of general formula HO—$(CH_2)_x$—OH where x is a number from 1 to 20, preferably an even number from 2 to 20. Preference is given to ethylene glycol, butane-1,4-diol, hexane-1,6-diol, octane-1,8-diol, and dodecane-1,12-diol. Neopentyl glycol is also preferred.

In addition, polycarbonate diols are also useful, as can be obtained for example by reacting phosgene with an excess of the low-molecular-weight alcohols mentioned as structural components for the polyester polyols.

Other polyester diols which are suitable are based on lactones, taking the form of lactone homopolymers or mixed polymers, preferably of adducts of lactones onto suitable difunctional starter molecules, having terminal hydroxyl groups. Useful lactones are preferably those derived from compounds of general formula HO—$(CH_2)_z$—COOH where z is a number from 1 to 20 and one hydrogen atom of a methylene unit may also be substituted by a $C_1$- to $C_4$-alkyl radical. Examples are ε-caprolactone, β-propiolactone, gamma-butyrolactone and/or methyl-ε-caprolactone, 4-hydroxybenzoic acid, 6-hydroxy-2-naphthoic acid or pivalolactone, and mixtures thereof. Examples of suitable starter components are the low molecular weight divalent alcohols which have been mentioned above as formation component for the polyester polyols. The corresponding polymers of ε-caprolactone are particularly preferred. Lower polyester diols or polyether diols may also be employed as starters for producing the lactone polymers. Instead of the polymers of lactones, the corresponding chemically equivalent polycondensates of the hydroxycarboxylic acids corresponding to the lactones may also be employed.

In polyurethane coatings, molar masses $M_n$ of the polyesters of 800-4000 g/mol are customary, although the polyesters used here are not limited thereto.

Further suitable binders are also polyetherols, which are prepared by addition of ethylene oxide, propylene oxide and/or butylene oxide, preferably ethylene oxide and/or propylene oxide and more preferably ethylene oxide, onto H-active components. Likewise suitable are polycondensates of butanediol. In polyurethane coatings, molar masses of the polyethers of 500-2000 g/mol are customary, although the polyethers used here are not limited thereto.

The polymers may be at least partly replaced by what are called reactive diluents. These may be blocked secondary or primary amines (aldimines and ketimines) or compounds having sterically hindered and/or electron-deficient secondary amino groups, for example aspartic esters according to EP 403921 or WO 2007/39133.

Examples of further coatings additives (G) that may be used include: further antioxidants, UV stabilizers such as UV absorbers and suitable free radical scavengers (especially HALS compounds, hindered amine light stabilizers), activators (accelerators), desiccants, fillers, pigments, dyes, antistatic agents, flame retardants, thickeners, thixotropic agents, surface-active agents, viscosity modifiers, plasticizers or chelating agents. Preference is given to UV stabilizers.

Suitable UV absorbers include oxanilides, triazines and benzotriazoles (the latter available, for example, as Tinuvin® grades from BASF SE) and benzophenones (e.g. Chimassorb® 81 from BASF SE). Preference is given, for example, to 95% benzenepropanoic acid, 3-(2H-benzotriazol-2-yl)-5-(1,1-dimethylethyl)-4-hydroxy-, C7-9- branched and linear alkyl esters; 5% 1-methoxy-2-propyl acetate (e.g. Tinuvin® 384) and α-[3-[3-(2H-benzotriazol-2-yl)-5-(1,1-dimethylethyl)-4-hydroxyphenyl]-1-oxopropyl]-ω-hydroxypoly(oxo-1,2-ethanediyl) (e.g. Tinuvin® 1130), in each case products, for example, of BASF SE. DL-alpha-Tocopherol, tocopherol, cinnamic acid derivatives and cyanoacrylates can likewise be used for this purpose.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g. bis(2,2,6,6-tetramethyl-4-piperidyl) sebacate. They are obtainable, for example, as Tinuvin® products and Chimassorb® products from BASF SE. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxyphenyl]methyl]butylmalonate (e.g. Tinuvin® 144 from BASF SE); a mixture of bis(1,2,2,6,6-pentamethyl-4-piperidinyl)sebacate and methyl(1,2,2,6,6-pentamethyl-4-piperidinyl) sebacate (e.g. Tinuvin® 292 from BASF SE); or which are N-(O-alkylated), such as, for example, decanedioic acid bis(2,2,6,6-tetramethyl-1-(octyloxy)-4-piperidinyl) ester, reaction products with 1,1-dimethylethyl hydroperoxide and octane (e.g., Tinuvin® 123 from BASF SE), and especially the HALS triazine "2-aminoethanol, reaction products with cyclohexane and peroxidized N-butyl-2,2,6,6-tetramethyl-4-piperidinamine-2,4,6-trichloro-1,3,5-triazine reaction product" (e.g. Tinuvin® 152 from BASF SE).

UV stabilizers are used usually in amounts of 0.1% to 5.0% by weight, based on the solid components comprised in the preparation.

Suitable thickeners include not only free-radically (co) polymerized (co)polymers but also customary organic and inorganic thickeners such as hydroxymethylcellulose or bentonite.

Chelating agents which can be used include, for example, ethylenediamineacetic acid and salts thereof and also β-diketones.

As component (G) in addition it is possible for fillers, dyes and/or pigments to be present.

Pigments in the true sense are, according to CD Römpp Chemie Lexikon-Version 1.0, Stuttgart/New York: Georg Thieme Verlag 1995, with reference to DIN 55943, particulate "colorants that are organic or inorganic, chromatic or achromatic and are virtually insoluble in the application medium".

Virtually insoluble here means a solubility at 25° C. below 1 g/1000 g application medium, preferably below 0.5, more preferably below 0.25, very particularly preferably below 0.1, and in particular below 0.05 g/1000 g application medium.

Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixed coat system.

Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example.

The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide and carbon black.

Dyes are likewise colorants, and differ from the pigments in their solubility in the application medium; i.e., they have a solubility at 25° C. of more than 1 g/1000 g in the application medium.

Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blancfixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 μm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case.

Preferred fillers include silicates, for example silicates obtainable by hydrolysis of silicon tetrachloride, such as Aerosil® from Degussa, siliceous earth, talc, aluminum silicates, magnesium silicates, and calcium carbonates, etc.

Preferably, the polyisocyanate composition does not comprise any desiccants, fillers, pigments, dyes, flame retardants or thickeners. These are preferably present in the composition reactive with the polyisocyanate.

For curing of the film, polyisocyanate composition and binder are mixed with one another in a molar ratio of isocyanate groups to isocyanate-reactive groups of 0.2:1 to 5:1, preferably 0.8:1 to 1.2:1 and especially 0.9:1 to 1.1:1, and it is optionally possible to mix in further coatings constituents, and the mixture is applied to the substrate and cured at ambient temperature up to 150° C.

"Hardening" in the context of the present invention is understood to mean the creation of a tack-free coating on a substrate by heating the coating material applied to the substrate to the above-specified temperature at least until at least the desired freedom from tack has occurred.

In the context of the present document, a coating material is understood to mean a mixture at least of the components intended for coating of at least one substrate for the purpose of forming a film and, after curing, a tack-free coating.

The substrates are coated by typical methods known to the skilled person, with at least one coating composition being applied in the desired thickness to the substrate to be coated, and the volatile constituents optionally present in the coating composition being removed, optionally with heating. This operation may if desired be repeated one or more times. Application to the substrate may take place in a known way, such as for example by spraying, troweling, knifecoating, brushing, rolling, roller coating, pouring, laminating, injection-backmolding or coextruding.

The thickness of a film of this kind for curing may be from 0.1 μm up to several mm, preferably from 1 to 2000 μm, more preferably 5 to 200 μm, very preferably from 5 to 60 μm (based on the coating material in the state in which the solvent has been removed from the coating material).

Additionally provided by the present invention are substrates coated with a multicoat paint system of the invention.

Polyurethane coating materials of this kind are especially suitable for applications requiring particularly high application reliability, exterior weathering resistance, optical qualities, solvent resistance, chemical resistance and water resistance.

The two-component coating compositions and coating formulations (two components here in the sense of the polyisocyanate composition (A) to (G) and the composition reactive therewith) obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, utility vehicles in agriculture and construction, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood flooring, can coating and coil coating, for floor coverings, such as in parking levels or in hospitals, in automotive finishes, as OEM and refinish.

In a preferred form, coating compositions of this kind are used at temperatures between ambient temperature and 80° C., preferably up to 60° C., more preferably up to 40° C. The articles involved are preferably those that cannot be cured at high temperatures, such as large machinery, aircraft, large vehicles and refinishes.

In another preferred application, the coating mixture is cured at 110-150° C., preferably at 120-140° C. (for example for OEM applications).

More particularly, the coating compositions of the invention are used as clearcoat(s), basecoat(s) and topcoat(s), primers and primer surfacers.

It is an advantage of the polyisocyanate compositions of the invention that they keep polyisocyanate mixtures colorstable over a long period in the presence of urethanization catalysts.

It is a further advantage of the polyisocyanate compositions of the invention that they have higher flocculation stability on storage during storage in solvents on exposure to (air) humidity. This is also the case when the polyisocyanate compositions do not comprise any Lewis-acidic organic metal compound.

Polyisocyanate compositions of this kind can be used as curing agent in coatings, adhesives and sealants.

As a result of their high color stability, polyisocyanate compositions are of particular interest for coating materials for clearcoats.

Polyisocyanate compositions are stored for long periods particularly with end users, particularly for refinishing and some industrial applications.

EXAMPLES

Feedstocks:
Polyisocyanates (A): isocyanurate based on hexamethylene diisocyanate
Polyisocyanate (A1): Basonat HI 100; polyisocyanurate from BASF SE. NCO content of the product: 22.0%, viscosity: 2900 mPa*s.
Polyisocyanate (A2): Basonat HI 2000; low-viscosity polyisocyanurate from BASF SE. NCO content of the product: 23.2%, viscosity: 1214 mPa*s
Polyisocyanate (A3), polyisocyanurate:
Hexamethylene diisocyanate HDI was converted in the presence of 70 ppm by weight of benzyltrimethylammonium hydroxyisobutyrate as catalyst, based on hexamethylene diisocyanate, 60% in ethylene glycol, in a three-reactor cascade at 110, 120 and 130° C. Hexamethylene diisocyanate was distilled off in a multistage process. NCO content of the product: 22.2%, viscosity: 2900 mPa*s
Polyisocyanate (A4), low-viscosity polyisocyanurate:
Hexamethylene diisocyanate HDI was converted in the presence of 34 ppm by weight of benzyltrimethylammonium hydroxyisobutyrate as catalyst, based on hexamethylene diisocyanate, 60% in ethylene glycol, in a three-reactor cascade at 100/120/140° C.
Hexamethylene diisocyanate was distilled off in a multistage process. Addition of 200 ppm by weight of Irganox® 1135 and 200 ppm by weight of Irgafos OPH. NCO content of the product: 23.1%, viscosity: 1320 mPa*s. In the examples, the additives are included in the list of stabilizers.
Polyisocyanate (A5), polyisocyanurate corresponding to example A1 of WO 2013060614:
Hexamethylene diisocyanate HDI was converted in the presence of 32 ppm by weight of benzyltrimethylammonium hydroxyisobutyrate as catalyst, based on hexamethylene diisocyanate, 5% in ethylhexanol, in a multistage reactor cascade at 120° C. with an average throughput time per reactor of 20 min. The reaction was stopped chemically with 12 ppm by weight of di(2-ethylhexyl) phosphate, based on hexamethylene diisocyanate, in a 10% solution in methylglycol. Hexamethylene diisocyanate was distilled off under reduced pressure. Addition of 300 ppm by weight of methoxyacetic acid and 100 ppm by weight of BHT. NCO content of the product: 22.2%, color number 21: Hz; viscosity: 2620 mPa*s.
Salt B
Phosphorus-containing acidic compounds (B1)
di(2-ethylhexyl) phosphate: DEHP; product from Lanxess

| | |
|---|---|
| dibutyl phosphate | DBP; product from Lanxess |
| Hordaphos ® MDB | butyl phosphate (≥80%; 1-10% n-butanol) from Clariant |

| | |
|---|---|
| Hordaphos® MOB | butyl phosphate (≥80%; ≤10% phosphoric acid) from Clariant |
| Rhodafac® PA 80 | mixture of dibutyl and butyl phosphate, 0-1% phosphoric acid, 0-4% butanol from Solvay |

Equivalent ratios were calculated from the stoichiometry. The following are roughly equivalent: 50 ppm by weight of DEHP, 38 ppm by weight of DBP, 28 ppm by weight of Hordaphos® MDB, 28 ppm by weight of Hordaphos® MOB, 33 ppm by weight of Rhodafac® PA 80. Nacure® 4167 was typically computed at 200 ppm by weight with 25% active components such as 50 ppm by weight of DEHP, even though, according to manufacturer data, it partly comprises monophosphoric acid, and there is a mixture of C6 to C10 and not C8.

| Open-chain trisubstituted amines (B2) | |
|---|---|
| triethylamine | product from Aldrich |
| N,N-dimethylcyclohexylamine | product from Aldrich |
| N,N-dimethylethanolamine | product from Aldrich |

Noninventive Amines:

Tinuvin® 770: bis(2,2,6,6-tetramethyl-4-piperidinyl) sebacate

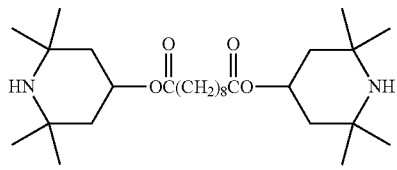

Tinuvin® 292: mixture of bis(1,2,2,6,6-pentamethyl-4-piperidinyl) sebacate and 1-methyl-8-(1,2,2,6,6-pentamethyl-4-piperidinyl) sebacate

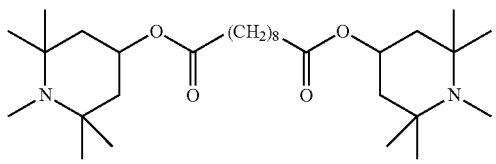

Salt B: Nacure® 4167: amine-neutralized phosphate from King Industries/Worlée in 30-40% propan-2-ol, 20-30% 2-methylpropan-1-ol. 30-40% reaction product of phosphoric acid, mono- or di(C6-C10)alkyl ester and an alkylamine. 25% "active" component in relation to catalysis of melamine resins (phosphoric esters).

Sterically Hindered Phenols (C):

| | |
|---|---|
| BHT | 2,6-bis(tert-butyl)-4-methylphenol from Sigma-Aldrich |
| pentaerythritol tetrakis(3-(3,5-di-tert-butyl-4-hydroxyphenyl)propionate) | Irganox® 1010 (I. 1010) from BASF SE |
| octadecyl 3-(3,5-di-tert-butyl-4-hydroxyphenyl)propionate | Irganox® 1076 (I. 1076) from BASF SE |
| isooctyl 3-(3,5-di-tert-butyl-4-hydroxyphenyl)propionate | Irganox® 1135 (I. 1135) from BASF SE |

Antioxidants (D):

| | |
|---|---|
| triphenyl phosphite | Tppt, from Aldrich |
| tributyl phosphite | TBP, from Aldrich |
| dioctyl phosphonate | Irgafos® OPH (OPH) from BASF SE |

Catalysts (E):

Catalyst: dibutyltin dilaurate (DBTL, DBTDL) from Sigma-Aldrich

Solvent (F):

| | |
|---|---|
| Solvent Naphtha (boiling range about 170-180° C.): amyl ketone methyl | Solvesso® 100 from Aldrich |

Further Acid Additive:

| | |
|---|---|
| N. 5076 | Nacure® 5076 (King Industries); dodecylbenzenesulfonic acid |

The polyisocyanates (A) were stored under nitrogen in

Formulation 1: 50% polyisocyanate, 50% Solvesso® 100. 1000 ppm by weight of DBTL/Solvesso® 100

Formulation 2: 50% polyisocyanate, 50% methyl amyl ketone. 1000 ppm by weight of DBTL/methyl amyl ketone with the concentrations of components (B)-(D) specified in the experiments in 25 mL in tightly sealed screwtop vessels with a volume of 30 mL at 50° C. in an air circulation oven for exclusion of air. Traces of air cannot be ruled out. After one measurement, the measurement solution was poured back into the screwtop vessel, the solution was blanketed with nitrogen and the screwtop vessel was carefully closed.

The percentages by weight of components (A) and (F) relate to 100% total weight based on polyisocyanate (A) and solvent (F). The concentrations of the compounds (B) to (E) in ppm by weight, in the respectively undiluted state of compounds (B) to (E), are based on the total amount of polyisocyanate (A). The tables state the amounts of the additives in ppm by weight.

The color number is measured in APHA to DIN EN 1557 on a Lico 150 from Lange in a 5 cm measurement cuvette with a volume of 5 mL. Error tolerances are for the target value 20 Hz (+/−5, actual value 18 Hz); target value 102 Hz (+/−10, actual value 99 Hz); target value 202 Hz (+/−20, actual value 197 Hz). Color numbers are measured directly (immediately before commencement of storage) and after storage over different periods of time.

Examples "B" (not component B here) were compared directly against references "R".

Interaction of Lewis Acid DBTL with Additives:

A mixture of 5% by weight of DBTL and 5% by weight of DEHP without amine in butyl acetate immediately gave a very large amount of white precipitate (almost 100% of the fill height). Even with 5% DBTL and 0.5% DEHP or with 0.5% DBTL and 0.05% DEHP, there was a precipitate in the interim that dissolved only after a few hours. There can be assumed to be a disadvantageous interaction of DEHP with DBTL, possibly also with coating haze.

A mixture of 5% by weight of DBTL and 5% by weight of DEHP and 1.8% triethylamine as inventive ammonium phosphate in butyl acetate gave about a quarter of the precipitate with DBTL/DEHP. In the lower concentrations with 5% DBTL, 0.5% DEHP and 0.18% triethylamine, or with 0.5% DBTL, 0.05% DEHP and 0.018% triethylamine, any precipitate dissolved much more quickly after the combination. There is assumed to be no adverse interaction, or at least a distinctly lesser interaction, of inventive ammonium phosphate with DBTL.

Storage Tests:

TABLE 1

Polyisocyanate (A5) with stabilizers in formulation 1 (Solvesso ® 100)

| | Stabilizers (ppm/A5) | | Storage time (d) | | | |
|---|---|---|---|---|---|---|
| | B | Acid | C | 0 | 7 | 28 | 70 |
| R1 | | 10 N. 5076*1 | 100 BHT | 9 | 15 | 55 | 84 |
| B1 | 200 Nacure ® 4167 | | 100 BHT | 9 | 15 | 16 | 21 |

*1ex. 2, PIC A1 of WO 2013060614
On addition of inventive salts (B) compared to prior art with free acids, better color drifts are obtained.

TABLE 2

Polyisocyanate (A3) with stabilizers in formulation 1 (Solvesso ® 100)

| | Stabilizers (ppm/A3) | | | Storage time (d) | | | |
|---|---|---|---|---|---|---|---|
| | B | Acid | C | 0 | 7 | 28 | 70 |
| R2*1 | | 50 DEHP | 100 I. 1135 | 15 | 27 | 35 | 66 |
| B2 | 200 Nacure ® 4167 | 50 DEHP | 100 I. 1135 | 15 | 26 | 28 | 35 |

*1ex. 6, PIC A2 of WO 2013060614
On addition of an inventive salt (B) compared to prior art with free acids, better color drift is observed.

TABLE 3

Polyisocyanate (A1) with stabilizers in formulation 1 (Solvesso ® 100)

| | Stabilizers (ppm/A1) | | | Storage time (d) | | | |
|---|---|---|---|---|---|---|---|
| | B | C | D | 0 | 7 | 28 | 70 |
| R3 | | 200 I. 1010 | 200 Tppt | 10 | 52 | 55 | 86 |
| B3 | 200 Nacure ® 4167 | 200 I. 1010 | 200 Tppt | 10 | 22 | 30 | 46 |
| B4 | 300 Nacure ® 4167 | 200 I. 1010 | 200 Tppt | 10 | 24 | 28 | 38 |
| R4 | | 200 I. 1010 | 200 OPH | 8 | 63 | 130 | X |
| B5 | 200 Nacure ® 4167 | 200 I. 1010 | 200 OPH | 8 | 30 | 40 | 57 |
| R5 | | 200 I. 1076 | 200 Tppt | 8 | 43 | 63 | 94 |
| B6 | 200 Nacure ® 4167 | 200 I. 1076 | 200 Tppt | 8 | 21 | 30 | 54 |
| B7 | 300 Nacure ® 4167 | 200 I. 1076 | 200 Tppt | 8 | 21 | 28 | 41 |
| R6 | | 200 I. 1135 | 200 Tppt | 8 | 46 | 51 | 100 |
| B8 | 200 Nacure ® 4167 | 200 I. 1135 | 200 Tppt | 8 | 22 | 29 | 42 |
| B9 | 300 Nacure ® 4167 | 200 I. 1135 | 200 Tppt | 8 | 21 | 23 | 39 |
| R7 | | 200 I. 1135 | 200 TBP | 9 | 49 | 52 | 89 |
| B10 | 200 Nacure ® 4167 | 200 I. 1135 | 200 TBP | 9 | 21 | 29 | 47 |
| B11 | 300 Nacure ® 4167 | 200 I. 1135 | 200 TBP | 9 | 29 | 27 | 37 |

Nacure ® 4167 improves color drift compared to specimens without Nacure ® 4167

TABLE 4

Polyisocyanate (A2) in formulation 1 (Solvesso ® 100)

| | Stabilizers (ppm/A2) | | | Storage time (d) | | | |
|---|---|---|---|---|---|---|---|
| | Phosphate/ammonium phosphate | C | D | 0 | 7 | 28 | 70 |
| R8 | | 200 I. 1135 | 200 OPH | 12 | 66 | 135 | 100 |
| R9 | 38 DBP | 200 I. 1135 | 200 OPH | 12 | 50 | 143 | 166 |
| B12 | 200 Nacure ® 4167 | 200 I. 1135 | 200 OPH | 12 | 22 | 43 | 46 |

Nacure ® 4167 improves color drift compared to a specimen without salt (B) and compared to a specimen with an acid rather than the salt (B).

TABLE 5

Polyisocyanate (A1) with addition of acids (reference) and acids + amines (example) in formulation 1 (Solvesso ® 100)

| | Stabilizers (ppm/A1) | | | Storage time (d) | | | |
|---|---|---|---|---|---|---|---|
| | Phosphate/ammonium phosphate | C | D | 0 | 7 | 28 | 70 |
| R10 | 50 DEHP | 200 I. 1135 | 200 OPH | 8 | 32 | 90 | 135 |
| R11 | 50 DEHP + 50 Tinuvin ® 292* | 200 I. 1135 | 200 OPH | 8 | 32 | 90 | 134 |
| R12 | 50 DEHP + 44 Tinuvin ® 770* | 200 I. 1135 | 200 OPH | 8 | 31 | 92 | 140 |
| B13 | 50 DEHP + 18 triethylamine* | 200 I. 1135 | 200 OPH | 8 | 26 | 35 | 42 |
| B14 | 57 DEHP + 18 triethylamine | 200 I. 1135 | 200 OPH | 11 | 21 | 34 | 45 |
| B15 | 50 DEHP + 23 dimethylcyclohexylamine* | 200 I. 1135 | 200 OPH | 8 | 23 | 31 | 48 |
| B16 | 57 DEHP + 16 dimethylethanolamine | 200 I. 1135 | 200 OPH | 11 | 25 | 42 | 51 |
| R13 | 28 Hordaphos ® MOB | 200 I. 1135 | 200 OPH | 8 | 25 | 63 | 127 |
| R14 | 28 Hordaphos ® MOB + 50 Tinuvin ® 292 | 200 I. 1135 | 200 OPH | 9 | 25 | 62 | 119 |
| R15 | 28 Hordaphos ® MOB + 44 Tinuvin ® 770 | 200 I. 1135 | 200 OPH | 9 | 25 | 62 | 126 |
| B17 | 28 Hordaphos ® MOB + 18 triethylamine | 200 I. 1135 | 200 OPH | 9 | 23 | 30 | 39 |
| B18 | 28 Hordaphos ® MOB + 23 dimethylcyclohexylamine | 200 I. 1135 | 200 OPH | 9 | 20 | 28 | 38 |
| R16 | 33 Rhodafac ® PA80 | 200 I. 1135 | 200 OPH | 8 | 36 | 111 | 213 |
| R17 | 33 Rhodafac ® PA80 + 50 Tinuvin ® 292 | 200 I. 1135 | 200 OPH | 9 | 29 | 84 | 154 |
| R18 | 33 Rhodafac ® PA80 + 44 Tinuvin ® 770 | 200 I. 1135 | 200 OPH | 9 | 34 | 87 | 160 |
| B19 | 33 Rhodafac ® PA80 + 18 triethylamine | 200 I. 1135 | 200 OPH | 9 | 23 | 33 | 37 |
| B20 | 33 Rhodafac ® PA80 + 23 dimethylcyclohexylamine | 200 I. 1135 | 200 OPH | 9 | 22 | 32 | 40 |

*about a 14% stoichiometric excess of amine. Otherwise, acids and amines are equimolar.

The addition of amine (B2) to acids (B1) improves color drift.

TABLE 6

Polyisocyanate (A3) with addition of ammonium phosphate in formulation 1 (Solvesso ® 100)

| | Stabilizers (ppm/A3) | | | Storage time (d) | | | |
|---|---|---|---|---|---|---|---|
| | B | C | D | 0 | 7 | 28 | 70 |
| R19 | | 200 I. 1010 | 200 OPH | 11 | 83 | 63 | 359 |
| B21 | 300 Nacure ® 4167 | 200 I. 1010 | 200 OPH | 11 | 21 | 27 | 58 |
| R20 | | 200 I. 1135 | 200 Tppt | 12 | 51 | 69 | 242 |
| B22 | 300 Nacure ® 4167 | 200 I. 1135 | 200 Tppt | 12 | 25 | 36 | 63 |

The examples with salt (B) are better than those without.

TABLE 7

Polyisocyanate (A4) with addition of ammonium phosphate in formulation 1 (Solvesso ® 100)

| | Stabilizers (ppm/A4) | | | Storage time (d) | | | |
|---|---|---|---|---|---|---|---|
| | B | C | D | 0 | 7 | 28 | 70 |
| R21 | | 200 I. 1135 | 200 OPH | 13 | 75 | 103 | 173 |
| B23 | 300 Nacure ® 4167 | 200 I. 1135 | 200 OPH | 13 | 18 | 20 | 18 |

The example with salt (B) is better than that without.

TABLE 8

Polyisocyanate (A1) with addition of ammonium phosphate in formulation 2 (methyl amyl ketone)

| | Stabilizers (ppm/A1) | | | Storage time (d) | | | |
|---|---|---|---|---|---|---|---|
| | Phosphate/ammonium phosphate | C | D | 0 | 7 | 28 | 70 |
| R22 | | 200 I. 1010 | 200 Tppt | 11 | 26 | 41 | 86 |
| B24 | 200 Nacure ® 4167 | 200 I. 1010 | 200 Tppt | 11 | 18 | 20 | 44 |
| B25 | 300 Nacure ® 4167 | 200 I. 1010 | 200 Tppt | 11 | 18 | 21 | 33 |
| R23 | | 200 I. 1010 | 200 I. OPH | 10 | 21 | 31 | 54 |
| B26 | 200 Nacure ® 4167 | 200 I. 1010 | 200 I. OPH | 10 | 20 | 23 | 34 |

TABLE 8-continued

Polyisocyanate (A1) with addition of ammonium phosphate in formulation 2 (methyl amyl ketone)

| | Stabilizers (ppm/A1) | | | Storage time (d) | | | |
|---|---|---|---|---|---|---|---|
| | Phosphate/ammonium phosphate | C | D | 0 | 7 | 28 | 70 |
| B27 | 300 Nacure ® 4167 | 200 I. 1010 | 200 I. OPH | 10 | 21 | 22 | 37 |
| R24 | | 200 I. 1076 | 200 I. OPH | 9 | 21 | 33 | 72 |
| B28 | 200 Nacure ® 4167 | 200 I. 1076 | 200 I. OPH | 9 | 21 | 24 | 38 |
| B29 | 300 Nacure ® 4167 | 200 I. 1076 | 200 I. OPH | 9 | 22 | 24 | 49 |
| R25 | | 200 I. 1076 | 200 Tppt | 9 | 23 | 34 | 84 |
| B30 | 200 Nacure ® 4167 | 200 I. 1076 | 200 Tppt | 9 | 17 | 19 | 34 |
| B31 | 300 Nacure ® 4167 | 200 I. 1076 | 200 Tppt | 9 | 24 | 16 | 37 |
| R26 | | 200 I. 1135 | 200 I. OPH | 12 | 28 | 39 | 70 |
| R27 | 200 DEHP | 200 I. 1135 | 200 I. OPH | 11 | 20 | 32 | 70 |
| B32 | 300 Nacure ® 4167 | 200 I. 1135 | 200 I. OPH | 11 | 20 | 28 | 36 |
| R28 | | 200 I. 1135 | 200 Tppt | 10 | 26 | 42 | 87 |
| B33 | 200 Nacure ® 4167 | 200 I. 1135 | 200 Tppt | 10 | 19 | 22 | 35 |
| B34 | 300 Nacure ® 4167 | 200 I. 1135 | 200 Tppt | 10 | 19 | 20 | 38 |
| R29 | | 200 I. 1135 | 200 TBP | 10 | 25 | 43 | 88 |
| B35 | 200 Nacure ® 4167 | 200 I. 1135 | 200 TBP | 10 | 19 | 21 | 30 |
| B36 | 300 Nacure ® 4167 | 200 I. 1135 | 200 TBP | 10 | 18 | 16 | 29 |

The examples with salt (B) are better than those without.

TABLE 9

Polyisocyanate (A3) with addition of ammonium phosphate in formulation 2 (methyl amyl ketone)

| | Stabilizers (ppm/A3) | | | Storage time (d) | | | |
|---|---|---|---|---|---|---|---|
| | B | C | D | 0 | 7 | 28 | 70 |
| R30 | | 200 I. 1135 | 200 Tppt | 17 | 19 | 56 | 112 |
| B37 | 300 Nacure ® 4167 | 200 I. 1135 | 200 Tppt | 17 | 16 | 25 | 50 |
| R31 | | 200 I. 1135 | 200 TBP | 17 | 27 | 66 | 141 |
| B38 | 300 Nacure ® 4167 | 200 I. 1135 | 200 TBP | 18 | 16 | 20 | 38 |
| R32 | | 200 I. 1010 | 200 Tppt | 20 | 15 | 58 | 108 |
| B39 | 300 Nacure ® 4167 | 200 I. 1010 | 200 Tppt | 20 | 24 | 22 | 39 |
| R33 | | 200 I. 1010 | 200 OPH | 20 | 19 | 43 | 111 |
| B40 | 300 Nacure ® 4167 | 200 I. 1010 | 200 OPH | 20 | 24 | 31 | 44 |
| R34 | | 200 I. 1076 | 200 OPH | 20 | 22 | 51 | 95 |
| B41 | 300 Nacure ® 4167 | 200 I. 1076 | 200 OPH | 20 | 22 | 25 | 39 |
| R35 | | 200 I. 1076 | 200 Tppt | 19 | 21 | 62 | 112 |
| B42 | 300 Nacure ® 4167 | 200 I. 1076 | 200 Tppt | 19 | 18 | 25 | 45 |

The examples with salt (B) are better than those without.

In performance tests, no disadvantages of coatings, for example of polyisocyanate/polyacrylate or polyisocyanate/polyacrylate/polyester, were found, for example in drying, evolution of pendulum hardness, scratch resistance, etch resistances, cross-cutting, Erichsen cupping or weathering.

The invention claimed is:

1. A polyisocyanate composition, comprising:
   (A) at least one polyisocyanate obtainable by reacting at least one monomeric isocyanate,
   (B) at least one salt in an amount of 10 to 300 ppm by weight, based on component (A), consisting of (B1) a phosphorus-containing acidic compound and (B2) an open-chain trisubstituted amine,
   (C) at least one sterically hindered phenol,
   (D) optionally at least one further antioxidant,
   (E) at least one Lewis-acidic organic metal compound capable of accelerating the reaction of isocyanate groups with isocyanate-reactive groups,
   (F) at least one solvent, and
   (G) optionally other coatings additives.

2. The polyisocyanate composition according to claim 1, wherein the monomeric isocyanate is a diisocyanate selected from the group consisting of hexamethylene 1,6-diisocyanate, pentamethylene 1,5-diisocyanate, isophorone diisocyanate, 1,3-bis(isocyanatomethyl)cyclohexane, 4,4'-di(isocyanatocyclohexyl)methane and 2,4'-di(isocyanatocyclohexyl)methane.

3. The polyisocyanate composition according to claim 1, wherein the polyisocyanate (A) comprises isocyanurate groups, biuret groups, urethane groups, allophanate groups and/or iminooxadiazinedione groups.

4. The polyisocyanate composition according to claim 1, wherein the polyisocyanate (A) comprises isocyanurate, allophanate and/or urethane groups that have been prepared using an ammonium carboxylate, ammonium hydroxide or ammonium α-hydroxycarboxylate catalyst.

5. The polyisocyanate composition according to claim 1, wherein the polyisocyanate (A) is a polyisocyanate comprising primarily isocyanurate groups and having a viscosity of 500-4000 mPa*s and/or a low-viscosity allophanate optionally comprising isocyanurate and/or urethane and having a viscosity of 150-1600 mPa*s.

6. The polyisocyanate composition according to claim 1, wherein the phosphorus-containing acidic compound (B1) is selected from the group consisting of alkyl phosphates (B1a), phosphonates (B1b) and mono-O-alkyl phosphonites (B1c).

7. The polyisocyanate composition according to claim 1, wherein the phosphorus-containing acidic compound (B1) has one of the general formulae (I) to (V)

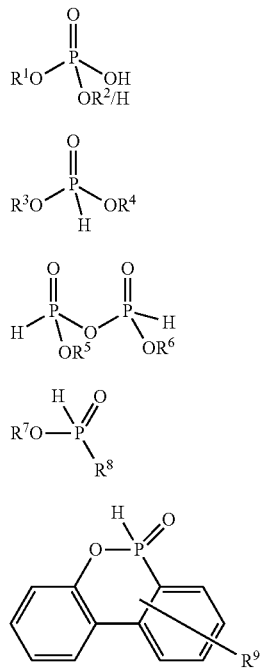

wherein R1 to R9 is in each case independently alkyl.

8. The polyisocyanate composition according to claim 1, wherein the open-chain trisubstituted amine (B2) is a trialkylamine.

9. The polyisocyanate composition according to claim 1, wherein the open-chain trisubstituted amine (B2) comprises a first corresponding acid having a pKa in aqueous solution between 5 and 14 at 25° C.

10. The polyisocyanate composition according to claim 1, wherein the phosphorus-containing acidic compound (B1) and the open-chain trisubstituted amine (B2) are used in a molar ratio of 1.2:0.8 to 0.5:1.

11. The polyisocyanate composition according to claim 1, wherein compound (C) has exactly one phenolic hydroxyl group per aromatic ring and in which at least one ortho position, based on the phenolic hydroxyl group, bear(s) bears an optionally substituted tert-butyl group.

12. The polyisocyanate composition according to claim 1, wherein compound (C) is selected from the group consisting of 2,6-bis(tert-butyl)-4-methylphenol (BHT), an alkyl 3-[3,5-di-tert-butyl-4-hydroxyphenyl]propionate, 3,3',3'',5,5',5''-hexa(tert-butyl)-α,α',α''-(mesitylene-2,4,6-triyl)tri-p-cresol, 1,3,5-tris(3,5-di-tert-butyl-4-hydroxybenzyl)-1,3,5-triazine-2,4,6(1H,3H,5H)-trione, octyl 3-(3,5-di-tert-butyl-4-hydroxyphenyl)propionate, C7-C9-alkyl 3-(3,5-di-tert-butyl-4-hydroxyphenyl)propionate and octadecyl 3-(3,5-di-tert-butyl-4-hydroxyphenyl)propionate.

13. The polyisocyanate composition according to claim 1, wherein the further antioxidant (D) is selected from the group of the phosphites, phosphonites, phosphonates and thioethers.

14. The polyisocyanate composition according to any claim 1, wherein the Lewis-acidic organic metal compound (E) comprises a metal selected from the group consisting of tin, zinc, titanium, zirconium and bismuth, and mixtures thereof.

15. The polyisocyanate composition according to claim 1, wherein the solvent (F) is selected from the group consisting of aromatic hydrocarbons, (cyclo)aliphatic hydrocarbons, ketones, esters, ethers, ether esters and carbonates.

16. A process for stabilizing a polyisocyanate composition, comprising adding to a polyisocyanate (A):
at least one Lewis-acidic organic metal compound (E) capable of accelerating the reaction of isocyanate groups with isocyanate-reactive groups,
at least one salt (B) in an amount of 10 to 300 ppm by weight based on the polyisocyanate (A), consisting of a phosphorus-containing acidic compound (B1) and an open-chain trisubstituted amine (B2),
at least one sterically hindered phenol (C),
optionally at least one further antioxidant (D),
at least one solvent (F), and
optionally at least one coating additive (G).

17. A process for producing polyurethane coatings, which comprises reacting a polyisocyanate composition according to claim 1 with at least one binder comprising isocyanate-reactive groups.

18. A process for producing polyurethane coatings, which comprises reacting a polyisocyanate composition according to claim 1 with at least one binder selected from the group consisting of polyacrylate polyols, polyester polyols, polyether polyols, polyurethane polyols, polyurea polyols, polyetherols, polycarbonates, polyester polyacrylate polyols, polyester polyurethane polyols, polyurethane polyacrylate polyols, polyurethane-modified alkyd resins, fatty acid-modified polyester polyurethane polyols, copolymers with allyl ethers and copolymers or graft polymers thereof.

19. A process, comprising employing the polyisocyanate composition according to claim 1 as a curing agent in at least one selected from the group consisting of coating materials in primers, primer surfacers, pigmented topcoats, basecoats and clearcoats in the sectors of refinishing, automotive refinishing, large vehicle finishing and wood, plastic and OEM finishing, in utility vehicles in the agricultural and construction sector and as curing agent in adhesives and sealants.

* * * * *